United States Patent

Zavoda

[15] 3,645,139
[45] Feb. 29, 1972

[54] SELF-RETAINING DIAPHRAGM SEAL FOR RECORDING INSTRUMENT

[72] Inventor: John R. Zavoda, 429 State Route #303, Streetsboro, Ohio 44240

[22] Filed: June 4, 1970

[21] Appl. No.: 43,372

[52] U.S. Cl. ..............................................73/406, 92/102
[51] Int. Cl. ............................................................G01l 7/08
[58] Field of Search ....................73/406, 408; 92/102, 104; 277/178

[56] References Cited

UNITED STATES PATENTS

| | | | |
|---|---|---|---|
| 2,437,440 | 3/1948 | Rigden | 73/406 UX |
| 2,550,672 | 5/1951 | Chyba | 92/102 |
| 3,231,232 | 1/1966 | Baumann | 92/102 X |
| 1,108,146 | 8/1914 | Deegan | 92/102 X |
| 1,964,745 | 7/1934 | Sauzedde | 92/102 |
| 3,209,721 | 10/1965 | Pall et al. | 73/406 X |

Primary Examiner—Louis R. Prince
Assistant Examiner—Daniel M. Yasich
Attorney—Isler and Ornstein

[57] ABSTRACT

A flexible diaphragm for a pressure recording instrument or the like which is provided with an annular groove around its periphery to define a resilient shoulder. The diaphragm is mounted in a coupling member which communicates with the instrument and is snapped into detachable securement over a projection or shoulder of the coupling member, which fits into the annular groove. The groove may carry an O-ring or similar compressible seal to effect a sealing engagement between the seat of the groove and the inserted shoulder, or the O-ring seal may be compressed against the coupling member by some peripheral portion of the diaphragm, such as a peripheral shoulder. Another sealing area may be provided by the abutment between the walls of the groove and the inserted shoulder of the coupling. Still another sealing area is provided by a marginal portion of the diaphragm which is compressed between the instrument coupling or flange member and another coupling or flange member is fastened thereto and which communicates with a process line.

4 Claims, 4 Drawing Figures

PATENTED FEB 29 1972

3,645,139

INVENTOR.
JOHN R. ZAVODA
BY Isler & Ornstein
ATTORNEYS.

SELF-RETAINING DIAPHRAGM SEAL FOR RECORDING INSTRUMENT

BACKGROUND OF THE INVENTION

In various process industries, particularly the chemical process industries, various liquids, gases or slurrys are maintained under vacuum or under pressure, either in vessels or in flow conduits, and the pressure values must be monitored. For this purpose, suitable gauges or recording instruments are mounted on the process vessels or on the flow lines or are remotely coupled thereto, to sense, indicate and record the existing pressure values.

In most chemical processes, as well as in many other process industries, it is both necessary and desirable to isolate the pressure sensing means of the recording instrument from the abrasive or corrosive or gumming action of the process material so that the sensing means will not be subjected to undue deterioration, injury or wear. To accomplish this isolation, it is common practice to provide a flange member or similar coupling unit having a cavity in communication with the pressure recording instrument. This instrument flange member is secured in abutting relationship to a process flange member which has a cavity in communication with the pressure fluid to be monitored. A flexible diaphragm of metal, rubber or synthetic resin serves to partition the instrument cavity from the process fluid cavity and is secured between the coupling or flange members at its marginal portions. A suitable compressible sealing gasket overlays the secured marginal portion of the diaphragm to effect the necessary seal on the margin of the diaphragm when the coupling members are bolted together or otherwise secured in operational abutment.

One side of the flexible diaphragm is thereby exposed to the pressure of the process fluids. The cavity in the instrument flange on the other side of the flexible diaphragm is filled with light oil or other suitable hydraulic fluid for communication with the pressure sensing means. The central portion of the flexible diaphragm is displaced or expanded in response to pressure fluctuations from the process fluid cavity and transmits these changing pressure values through the hydraulic fluid medium in the instrument flange cavity for sensing by the recording gauge or instrument.

After some period of use, whose duration depends greatly upon the character of the process fluid, the process fluid cavity as well as the process side of the flexible diaphragm will have gathered or accumulated a sufficient amount or quantity of deposits of sludge or precipitates or other solids from the process fluids to which it is exposed, so that cleaning of the process cavity and the process flange becomes necessary. The frequency of this cleaning can be diminished by the use of various forms of "flush-out" arrangements and fittings in a manner known to the art, but eventually a more thorough cleaning becomes mandatory and requires disassembly of the unit for access to the interior of the process flange member. Inasmuch as the marginal portion of the diaphragm is clamped between the two flange members, it no longer has any securement when the flange members are uncoupled for disassembly and cleaning. Its seal with the hydraulic instrument fluid is broken when the flanges are disassembled. This ordinarily results in the loss of all or a good part of this hydraulic fluid which must then be replaced when the unit is reassembled. The replacement of the hydraulic fluid is not only a tedious and time-consuming task, but can also result in the necessity for recalibrating the unit as a result of there being a greater or lesser quantity of the replacement hydraulic fluid than was contained in the unit before the disassembly. The sealing gaskets will ordinarily have acquired a permanent set which makes it necessary for the gasket to be replaced after the cleaning operation has been completed and the unit is to be reassembled. If the gasket is not replaced, it is quite likely that an imperfect seal between the coupling members will result on reassembly of the unit and that leakage will occur.

In order to at least prevent the unnecessary loss of the hydraulic fluid from the instrument cavity, some of the prior art diaphragm seals include a third coupling member or so-called "middle ring" which is secured to the instrument flange member and serves to clamp the diaphragm in position, in lieu of using the process flange member for this purpose. The process flange member is then secured to the middle ring, independently of the securement of the middle ring to the instrument flange member. By this arrangement, the process flange member can be disassembled without disturbing the assembly of the diaphragm in its position between the instrument flange member and the middle ring. However, this arrangement represents a costly solution to the problem, as it requires an additional part in the form of the middle ring and this additional part is exposed to the process fluid and must therefore be made of the same type of material as the process flange, which is usually made of an extremely expensive noncorrosive nickle-bearing alloy or the like.

The foregoing disadvantages, as well as others to be described, are overcome by the self-retaining diaphragm of the invention.

SUMMARY OF THE INVENTION

The invention relates to a self-retaining diaphragm for a pressure recording instrument and the like which is snapped into securement in the cavity of the assembly, preferably in the instrument flange member, so that when it is necessary to uncouple the flange members for cleaning or other attention, the diaphragm is retained by the instrument flange member in sealing engagement with the hydraulic fluid, without reliance upon any clamping securement between the coupling members.

DESCRIPTION OF THE PREFERRED EMBODIMENTS

Figure 1:
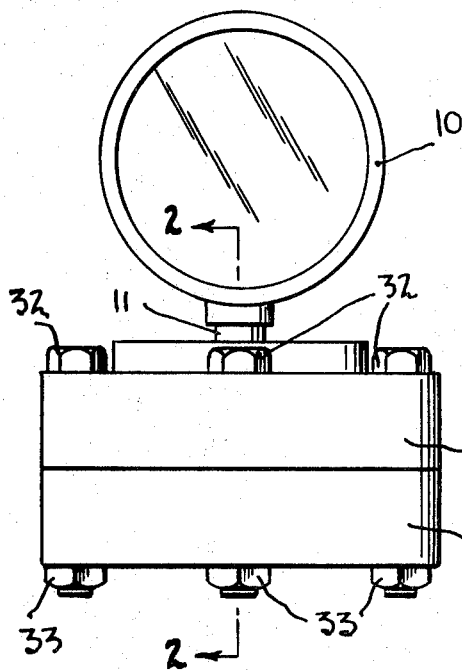
FIG. 1 is a view in elevation of a pressure recording unit embodying the features of the invention.
Figure 3:
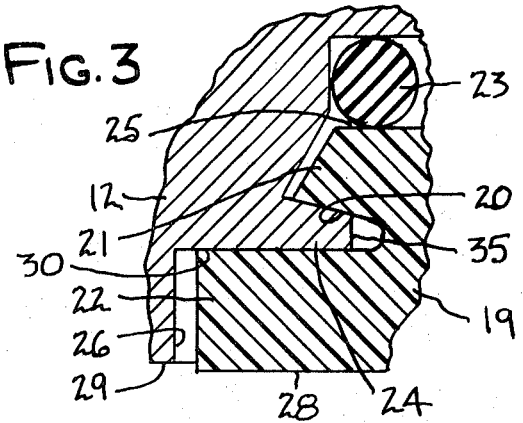
FIG. 3 is an enlarged fragmentary cross-sectional view of a portion of FIG. 2 showing the peripheral sealing and securing means in greater detail.
Figure 2:
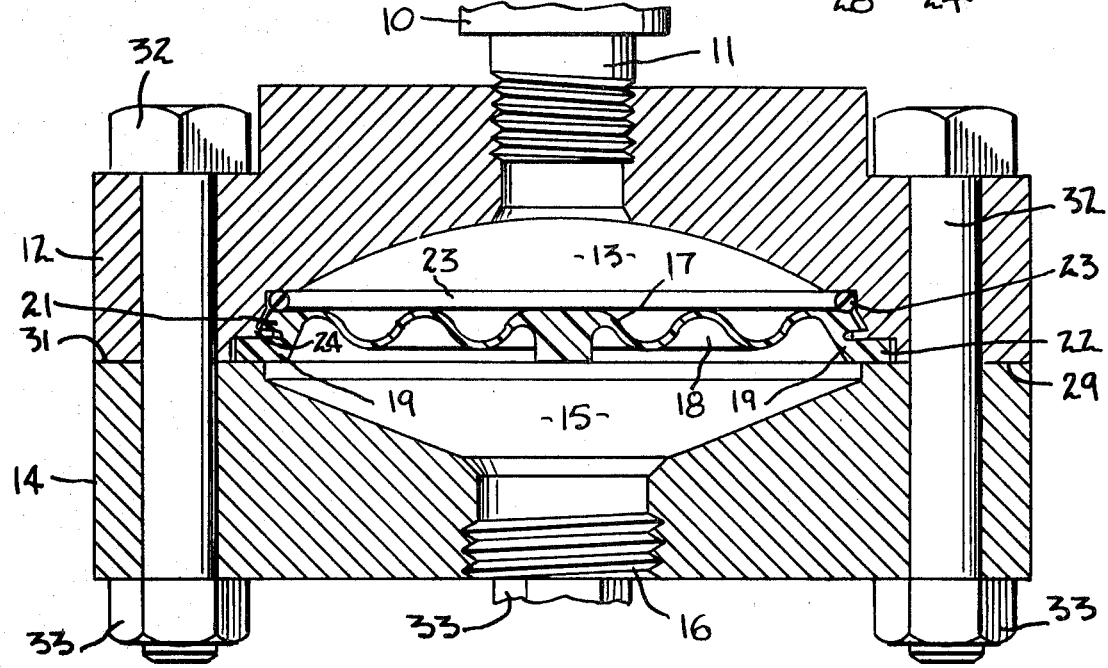
FIG. 2 is an enlarged cross-sectional view, taken as indicated on line 2—2 of FIG. 1.

Referring more particularly to FIGS. 1–3 of the drawings, there is shown a conventional form of pressure recording gauge or instrument 10 which is secured, as by the externally threaded extension 11 to an instrument coupling or flange member 12 in communication with a cavity 13 therein. The instrument flange member 12 is secured in face-to-face abutment with a process flange member 14 which has a cavity 15 which is adapted to be connected to a process flow line or receptacle through the internally threaded opening 16.

It will be understood that the term "pressure" as used herein is intended to broadly include subatmospheric pressures as well as greater than atmospheric pressures. It will also be understood that although the unit is described as being mounted directly on a pipeline or process vessel, the principles of the invention can also be utilized in those applications where the sensing unit is more remote from the pressure source.

A flexible diaphragm 17 of circular configuration is mounted on the coupling flange 12 so as to provide a partition between the cavities 13 and 15. As shown in FIG. 2 of the drawings, the diaphragm has a central or body portion 18 of wavelike cross section to enhance the flexibility and displacement characteristics of the diaphragm. Preferably, the diaphragm is molded as a single-unitary structure using Teflon or other synthetic compositions having the necessary chemical and physical characteristics which are desired for optimum performance of the diaphragm. However, the principles of the invention do not preclude the use of metal or rubber or composite materials, such as a rubber body with a metal-reinforced periphery, for the structure of the diaphragm.

The body portion 18 of the diaphragm is surrounded by a peripheral or marginal portion 19 of somewhat greater thickness than the body portion 18, and which is provided with an annular groove 20 which lies or extends substantially in the plane of the diaphragm. The groove defines a resilient undercut shoulder 21 which extends outwardly from the diaphragm and is exposed to the instrument cavity 13. An underlying shoulder or marginal portion 22 of the diaphragm is defined on the opposite side of the groove 20 and extends outwardly from the diaphragm and is exposed to the cavity 15.

The diaphragm 17 is secured in the instrument flange 12 by snapping its marginal portion 19 over and onto an annular inwardly directed projection or shoulder 24 of the flange 12 which is received in the annular groove 20. The shoulder 21 extends outwardly from the base of the groove to overlie the shoulder 24 sufficiently to restrain the displacement of the marginal portion of the diaphragm from its securement to the instrument flange member at the pressure operating conditions to which it will be exposed. Ordinarily, the pressures on the opposite sides of the diaphragm are in equilibrium so that there is no significant differential pressure within the instrument cavity 13 which will tend to displace the marginal portion 19 from its snap-in securement. For test purposes and to provide a margin of safety, the shoulder 21 may preferably be of a length sufficient to resist displacement of the marginal portion 19 when exposed to a differential pressure of one atmosphere in the cavity 13. This is merely presented by way of example and is not to be construed as a limitation. The necessary length of the shoulder 21 will also be affected by the strength, resiliency and physical characteristics of the material which is used for the diaphragm. These factors affecting the dimension of the shoulder 21 to achieve the desired adequate securement, must in turn be compromised with the need for ease of assembly so that the installation of the diaphragm should not be unduly difficult and complicated. The weighing and evaluation of such factors to properly dimension the length of the shoulder 21 is well within the skill of the art and requires no further elaboration.

Ordinarily, the opposite shoulder or marginal portion 22 will extend outwardly from the diaphragm to a greater extent than the shoulder 21, as it is desirable that the portion 22 present a substantial surface area to the process cavity 15, as well as to the clamping surfaces of the coupling members 12 and 14 between which it is retained.

A compressible seal, such as an O-ring 23, is positioned in sealing engagement between the marginal portion 19 of the diaphragm and the interior of the cavity 13. In the form of invention shown in FIGS. 2 and 3 of the drawings, the seal 23 is shown as being positioned between the wall of the cavity 13 and the upper face 25 of the shoulder 21.

An annular groove 26 is provided below the projection 24 for receiving the shoulder 22 of the diaphragm. The shoulder 22 is of slightly greater thickness than the depth of the groove 26 in which it is received. The lower surface 28 of the shoulder 22 thus extends beyond the lower surface 29 of the coupling flange 12 and will be subject to some slight compression between the upper surface 30 of the recess 26 and the surface 31 of the process flange 14 when the flanges 12 and 14 are secured in face-to-face relationship, as by the bolts 32 and nuts 33.

With the device assembled in the manner illustrated in FIGS. 1 and 2 of the drawings, and with the cavity 13 substantially filled with a light oil or other suitable hydraulic medium, the O-ring 23 effects a seal against leakage of the instrument fluid from the cavity 13 regardless of whether the flange members 12 and 14 are clamped together or not. However, when the flange members are clamped together there is an additional axial thrust or force transferred to and imposed upon the O-ring 23 which further augments the sealing force imposed upon the O-ring by its engagement with the surface 25 of the shoulder 21.

In addition to the primary seal effected by the O-ring 23, a secondary seal is effected between the upper surface 30 of the recess 26 and the upper surface 27 of the shoulder 22. This secondary seal is, to some extent independent of the coupling of the flange member 14 to the flange member 12, although it is of course augmented and perfected as a result of the clamping action of the bolts 32 upon the shoulder 22. The sealing engagement between the surfaces 27 and 30 would at least prevent tainting of the process fluid by the instrument fluid as long as the flange members 12 and 14 are in the clamped relationship, even though the primary seal 23 should become ineffective for some reason. Although the possibility of the seal 23 becoming ineffective is quite remote, the utilization of a secondary sealing area is advisable, particularly when the process fluid relates to foods or drugs.

In addition to the secondary seal provided between the surfaces 27 and 30, there is another secondary seal which may be provided between the surfaces of the projection 24 and the walls of the diaphragm groove 20. These parts may be so dimensioned that the projection 24 will be received snugly in the groove 20 and will create a secondary seal against leakage of fluid from the instrument cavity 13 regardless of whether the flange members 12 and 14 are in coupled relationship or not.

The body portion 18 of the diaphragm 17 will be displaced by the pressure differential between the respective cavities 13 and 15 so as to reflect the process pressures to the pressure recording instrument 10. It will be noted that as the body portion 18 of the diaphragm is displaced upwardly in the cavity 13, there is an increased axially directed component of force on the O-ring 23 which further augments the sealing action of that O-ring. Conversely, the O-ring resists and to some slight degree restricts this displacement of the diaphragm body portion 18, thus resulting in some slight loss of sensitivity of the diaphragm in the pressure sensing function. This slight loss of sensitivity is not critical or significant in many pressure sensing operations, but may be of significance in some others. Additionally, when the monitored process is an uninterrupted one intended to run at a fairly uniform pressure for long periods of time, it is possible that the O-ring 23 will attain a permanent set resulting from the augmented axial component of force previously described, so that when the flange members 12 and 14 are uncoupled, the desired zero leakage of the seal 23 will not be achieved. As is known to the art, the problem of hysterisis or delayed recovery of the seal 23 in response to relieved compressive force, must also be considered as a factor in designing a seal which will achieve zero leakage. These problems are effectively overcome by mounting the O-ring in the groove 20 as illustrated in FIG. 4 of the drawings.

Figure 4:
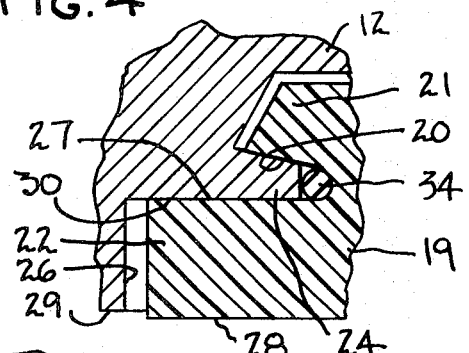
FIG. 4 is a view similar to FIG. 3, but showing a modified form of the invention.

In the modified form of invention shown in FIG. 4, an O-ring 34, which may be of considerably smaller cross section than the O-ring 23, is mounted in the base of the groove 20 in sealing engagement with the end 35 of the projection 24. The sealing force on the O-ring 34 is substantially in the direction of the plane of the diaphragm 17 and is diametrical rather than axial, as in FIG. 3. The operative displacement or flexing of the body portion 18 of the diaphragm has no significant compressive effect upon the O-ring 34 so that the hysterisis or nonrecovery problem is minimized in those process applications where it might exist and be a troublesome factor. In contrast to the form of invention shown in FIG. 3, the O-ring 34 does not resist or restrict the flexing movement of the body portion 18 of the diaphragm so that there is no damping of its sensitivity, as was possible by the O-ring 23. Thus, by mounting the O-ring in the groove 20 the problems of permanent set and of hysterisis and of interference with sensitivity are overcome. The arrangement of FIG. 4 is therefore preferred over that of FIG. 3, particularly in the applications where a high degree of sensitivity of pressure recording is sought. There may be unusual circumstances where it may be desirable to utilize the seals 23 and 34 in combination and this is contemplated as being within the scope of the invention.

It will be noted that in both forms of the invention, the effect of an increase in pressure in the cavities 13 and 15 will be translated into augmented sealing engagement as a result of either cold flow at the margin of the diaphragm or greater compressive force on the sealing surfaces or a combination of both these factors. For this reason, the device can be effectively and successfully utilized for extremely high-pressure sensing conditions, where devices of this type have heretofore not been effective.

Regardless of which arrangement is used, the arrangement of FIG. 3 or the arrangement of FIG. 4 or a combination of these arrangements, the unit may be disassembled for cleaning without disturbing the primary seals effected by the O-rings 23 and 34 and without losing any of the hydraulic fluid from the cavity 13. When the securing or clamping elements 32–33 are removed, the instrument flange 12 can be withdrawn bodily from its abutment with the process flange 14 without disturbing the assembly of the diaphragm 17 with the instrument flange. This results from the fact that the diaphragm 17 is self-retaining on the instrument flange and does not rely upon the clamping action between the abutting surfaces of the flanges 12 and 14 for retention or for its primary sealing engagement with respect to the cavity 13. The problem of replacing a gasket has been completely eliminated by the self-retaining diaphragm, and the task of refilling the cavity 13 with the hydraulic fluid has also been eliminated, thus eliminating the necessity for recalibration of the unit after it has been reassembled. This has been accomplished without introducing the costliness and leakage vulnerability of an additional coupling member such as the middle ring previously mentioned. In addition to providing the self-retaining diaphragm, the invention also provides an improved seal arrangement for the instrument cavity with secondary seals to assure effective functioning if there is any failure of the primary seal.

Although the device has been described as having a shoulder 22 received in the annular groove 26 of the instrument flange 12, it will be apparent that the clearance space provided by the annular groove 26 could with equal facility be provided in the abutting surface of the process flange 14 or could be provided by complementary annular grooves in both of the flange members.

I claim:

1. In a diaphragm assembly for a recording instrument, the combination of a coupling member having a cavity in communication with the instrument, an annular projection of said coupling member extending inwardly into said cavity, a self-retaining pressure-responsive diaphragm having a peripheral annular groove in the general plane thereof and defining an undercut yieldable shoulder element, said projection being receivable in said groove by deformation of said yieldable shoulder element for releasably securing said diaphragm in said cavity, and a compressible seal for said cavity carried in said diaphragm groove and engaging said projection on said coupling member.

2. A combination as defined in claim 1, wherein said yieldable shoulder element impresses a compressive force on said compressible seal in the direction of the general plane of said diaphragm.

3. A combination as defined in claim 1, wherein said projection is in sealing engagement with the walls of said groove to effect a secondary seal for said cavity.

4. A combination as defined in claim 1, including a second coupling member secured in face-to-face relationship with said first-named coupling member and defining a second cavity on that side of said diaphragm opposite to said first-named cavity, and a second compressible seal comprising a marginal portion of said diaphragm disposed in compressible relationship between said coupling members.

* * * * *